United States Patent [19]

Gallagher

[11] 4,332,828
[45] Jun. 1, 1982

[54] METHOD AND APPARATUS FOR COOKING FOOD IN AN ENCLOSED CHAMBER

[76] Inventor: Alfred H. Gallagher, 6 Keystone Ave., River Forest, Ill. 60305

[21] Appl. No.: 179,541

[22] Filed: Aug. 19, 1980

Related U.S. Application Data

[63] Continuation of Ser. No. 2,193, Jan. 9, 1979, abandoned, which is a continuation-in-part of Ser. No. 823,952, Aug. 12, 1977, abandoned.

[51] Int. Cl.³ .................................................. A23L 1/00
[52] U.S. Cl. ....................................... 426/523; 99/401; 99/447; 99/422; 126/221; 126/214 D
[58] Field of Search ............... 426/523, 520; 126/9 A, 126/9 B, 25 R, 25 A, 41 R, 221, 214 D, 376; 99/401, 446, 447, 422, 425

[56] References Cited

U.S. PATENT DOCUMENTS

| | | | |
|---|---|---|---|
| 693,725 | 2/1902 | Leland | 99/446 |
| 768,899 | 8/1904 | Hall | 126/221 |
| 1,145,691 | 7/1915 | LaJack | 126/25 R |
| 2,943,557 | 7/1960 | Suehlsen | 126/9 A |
| 3,127,828 | 4/1964 | Fine | 99/425 |
| 3,581,731 | 6/1971 | Schulze | 126/25 R |
| 4,020,323 | 4/1977 | Dills | 126/41 R |

*Primary Examiner*—Joseph M. Golian
*Assistant Examiner*—George C. Yeung
*Attorney, Agent, or Firm*—Fitch, Even, Tabin, Flannery & Welsh

[57] ABSTRACT

A flat rigid pad having a central core of heat insulating material which supports two sheets of radiant heat reflecting material, such as foil, is removably located on the grate of an enclosed cooking chamber having a heat source in the bottom portion of the enclosed chamber. An uncovered cooking vessel containing food is located on the pad. The sheets of foil each have one shiny and highly reflective side, both facing in the same direction, so that the pad can be placed on the grill with both reflective surfaces directed downwardly toward the heat source in the chamber.

3 Claims, 5 Drawing Figures

METHOD AND APPARATUS FOR COOKING FOOD IN AN ENCLOSED CHAMBER

This is a continuation of application Ser. No. 2,193, filed Jan. 9, 1979, now abandoned, which in turn is a continuation-in-part application of my earlier filed application, Ser. No. 823,952, filed on Aug. 12, 1977, now abandoned.

In the field of cooking food in an enclosed chamber, such as an oven or a barbeque grill, it is conventional for a heat source, such as a gas burner, charcoal or electric element, to be located at the bottom of the chamber and a horizontal grate to be located above the heat source. Food, for which a charred surface is not desired, is placed in a pan which is placed upon the grate. Heat generated by the heat source is applied directly to the pan and food by radiant energy and by heated air currents which naturally rise from the heat source.

As a result of the direct heat application from below, food which is cooked in this manner tends to dry and requires basting at regular intervals to maintain moisture. This basting is time consuming for the cook, but more importantly, each time the oven or grill is opened, large amounts of heat escape from the cooking chamber. This heat loss is an undesirable expense and in addition increases the cooking time because the temperature in the chamber must be raised again to the cooking temperature after each basting operation.

It is known in the field of cooking that convection cooking essentially overcomes the need for regular basting. In convection ovens, heated air is forced to move violently throughout the chamber, often by a fan, providing an even cooking process as well as a very pleasant browning effect upon the cooked food. Such ovens, however, are specially built to be used only for convection cooking.

It is therefore an object of the invention to provide a removable pad for use in cooking in a conventional enclosed cooking chamber, at a temperature of about 350°-400° F., such as an oven or barbeque grill which contains a heat source in the bottom portion of the enclosure, whereby food is cooked primarily by convection air currents rather than direct application of heat from below.

It is also an object to provide a method of deflecting heated air currents and radiant heat from direct application to a pan and the food contained therein and of developing convection currents for the cooking of the food.

It is a further object to provide a removable deflecting pad and a method associated therewith, which enables the ambient and convected heat from the fuel to move throughout the grill, contacting all exposed surfaces of the food being cooked.

A still further object is to provide a deflector pad of the foregoing character which is simple in construction and is readily adapted to cooking vessels of nearly all kinds, and which is inexpensive and, while it is not of throw-away, or one-time use type, it is nevertheless so inexpensive that if it should be discarded after a few times of use, no serious loss would be incurred.

Further objects and advantages of the present invention, together with the organization and manner of operation will become apparent from the following description of the invention when taken in conjunction with the accompanying drawings, wherein.

Figure 1:
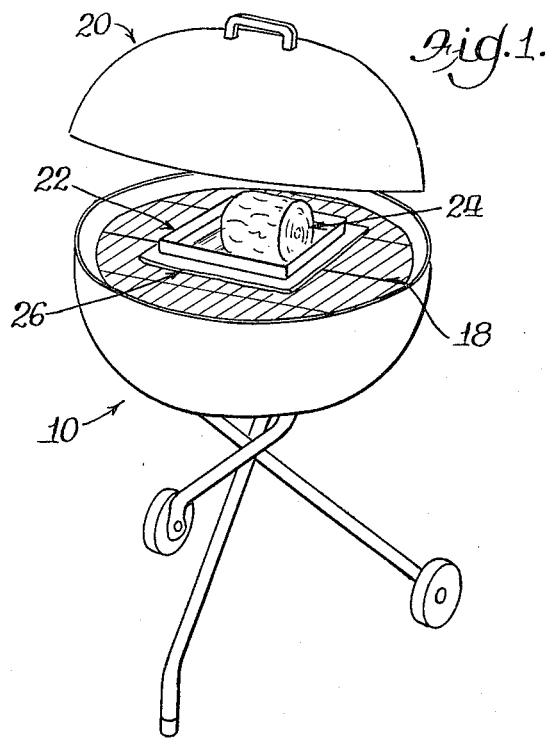
FIG. 1 is a perspective view of an enclosable barbeque grill containing a pad and a cooking vessel therein, embodying various of the features of the present invention.
Figure 2:
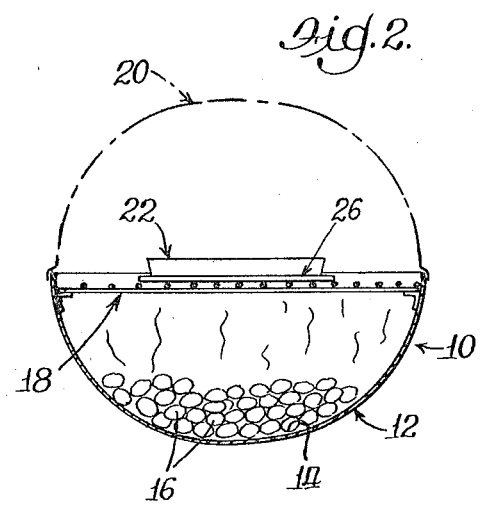
FIG. 2 is a semi-diagrammatic vertical sectional view of an enclosed grill containing a pad and a cooking vessel therein.

Referring to the drawings, FIG. 1 is a perspective view of a well-known type of barbeque grill 10 having a bottom bowl 12 defining a pit 14 in which the heat source 16 is located, this fuel commonly being charcoal, gas or other material which becomes radiant or incandescent or red hot upon burning or electrification. For example, incandescent coal, commonly known as "coals" produces intense radiant heat used in the cooking.

The grill includes a grate 18 mounted in the bottom part or bowl 12 adjacent the top of the latter and above the heat source 16. The grill further generally includes a cover 20, and this feature is of significance in the use of the device of the present invention, as will be brought out in more detail hereinbelow, in forcing the convected heat currents to flow vigorously throughout the grill, contacting all exposed surfaces of food being cooked.

A cooking vessel 22 is shown, this being in the form of a convectional pan, holding the food 24. Interposed between the pan 22 and heat source 16 is a planar pad, lying on the grate 18, the pan 22 being set directly on the pad. As will be referred to hereinbelow, the pad 26 is at least as large as the pan, but preferably not substantially larger.

Figure 3:
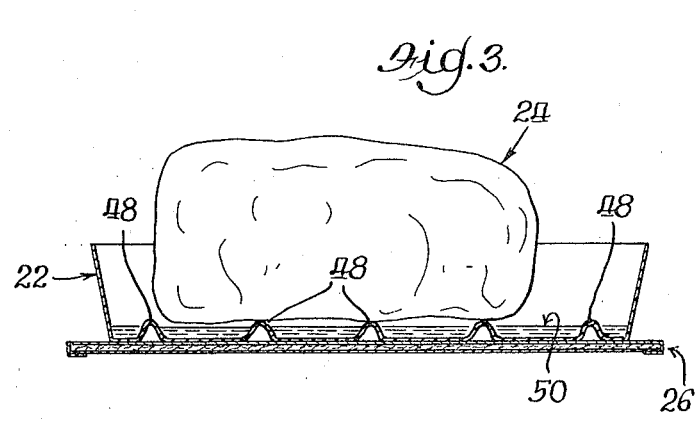
FIG. 3 is a vertical sectional view of a cooking vessel and a pad thereunder.
Figure 4:
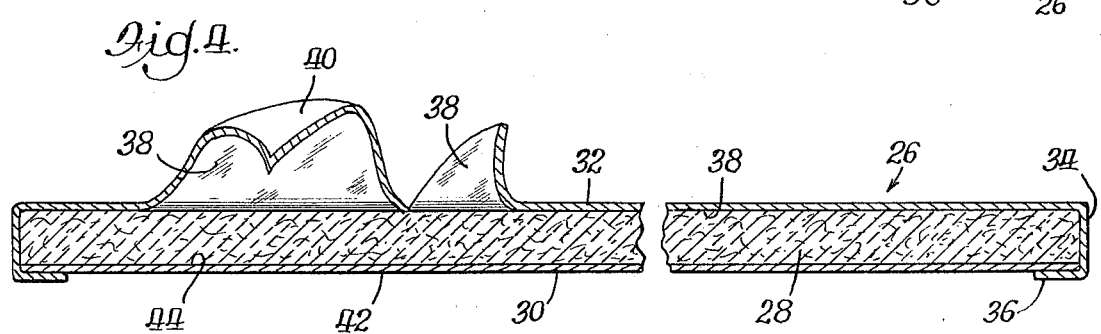
FIG. 4 is a large scale sectional view of a pad for use in accordance with the present invention.

FIGS. 3 and 4 show the specific construction of one embodiment of the pad 26. The pad includes a central core 28 of heat insulating material and bottom and top sheets 30, 32, respectively, of radiant heat reflecting material covering the central core. The central core 28 is preferably asbestos, of a kind known in the trade as asbestos mill board. A sheet such as on the order of 3/32" thickness is suitable for this purpose. This dimension is of course not critical and a wide range of dimensions is permissible within the practice of the invention. The asbestos material is pressed and compacted and forms a relatively stiff, rigid, and self-sustained article.

The heat reflecting sheets, 30, 32 may be of suitable metallic foil, preferably aluminum, and one side of the sheet material is highly reflective, or shiny. The other side of each sheet 30 and 32 is of lower reflectivity, as a brushed metal. The central core 28 is covered by these sheets 30 and 32 as represented in FIG. 4, which shows a simple construction. The bottom sheet 30 may be congruent with the central core, for example, and the top sheet 32 provided with extended marginal edge portions 36 which underlie the under surface of the bottom sheet 30. These marginal portions 36 are then crimped to the edge portions of the bottom sheet 30 and no further securing means need be utilized.

As indicated above, each of the foil sheets 30, 32 have one side that is highly reflective, or shiny. The sheets are arranged with both of the shiny sides facing in the same direction, the top sheet 32 having a shiny under side 38 and a brushed metal upper side 40, while the corresponding sides of the bottom sheet are indicated at 42, 44. The pad is placed on the grate with both shiny surfaces 38 and 42 directed downwardly, toward the heat source. FIG. 4 shows a portion of the top sheet 32 peeled away to expose the surface 38 which is highly reflective, and the less reflective surface 40.

Figure 5:
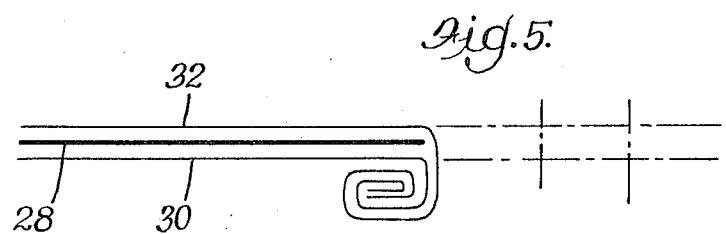
FIG. 5 is a diagramatic fragmentary view of the elements of a pad in an alternate form of construction.

FIG. 5 shows an alternate detail construction of a pad, and in particular of the means of securing the foil sheets on the central core 28. The central core is shown and the two foil sheets 30, 32 fitted thereover with the marginal edge portions of substantial length. These are then folded over one another forming a full and tighter attachment.

In both the construction of FIG. 4 and FIG. 5 the foil sheets are folded under the bottom of the pad. Thus, in the event that there is any spattering or leaking of liquid from the pan, the liquid will run off the pad and not contact the core.

The pad 26 is a single, unitary, and effectively integral article. The central core of asbestos 28, as mentioned above, is rigid, and the addition of the sheets of foil 30, 32 add to this rigidity of the article. The pad is very thin as compared with the various articles such as the cooking vessel, etc., and is easy to stack or store, together with a number of others, when not in use.

The pan 22 may be of aluminum, pans of this kind being well-known at the present time. In the present case, the pan 22 is provided with corrugations 48 in the bottom element, on which the food 24 rests, the juice or grease from the food being indicated at 50, which is represented herein in the form of liquid, this fact being significant in the use of the shield or pad. Additional liquid, such as wine, may also be added in the pan.

When the cooking vessel is exposed directly to the coals, as has heretofore usually been the case, the bottom element of the cooking vessel absorbs both radiant heat and convectional heat, thus becoming exceedingly hot—much hotter than the convected currents in the grill. Such heat encountered normally quickly burns any drippings that exude from the food and fall on the bottom of the pan, and fumes from this burning are usually acrid and very obnoxious. They, of course, do not remain liquid since they are burned. In the present case, although the foil sheet 30 reflects a substantial portion of the radiant heat, and deflects the convection air currents, a portion of the heat is absorbed by the foil. The heat insulating material of the central core 28 serves to prevent conduction of this absorbed heat to the pan. The reflective surface 38 serves to further limit the heat applied to the bottom of the pan. The cooking vessel remains sufficiently cool that the drippings or grease remain in liquid form as represented in FIG. 3.

The foil sheets 30 and 32 reflect substantially all of the radiant heat directed from the heat source toward the bottom of the pan. Such foil reflects such heat, and the reflecting function in the present instance is greater than normal by directing both highly reflective or shiny surfaces of the foil sheets downwardly toward the coals to more efficiently reflect the radiant heat. The multiple sheets greatly enhance the reflecting effect.

The pad 26 preferably is pre-dimensioned so as to be at least as large as the area of the pan 22 which is exposed to radiant heat from the heat source. However, it is desired that the pad not be materially larger than this exposed area of the pan so as to enable the maximum movement or flow of the deflected convection currents in the space within the grill. Thus the greater the space surrounding the cooking vessel, the greater will be the freedom of movement of the deflected hot air currents. Correspondingly, the pad 26 should not be materially greater than the dimensions of the pan in keeping with the desire of maximum space surrounding the cooking vessel or pan.

As indicated above, the pad 26 is placed flat on the grate 18 directly above the heat source, and then the open pan 22, with the food therein, is simply set on the shield or pad and the chamber is closed.

The pad 26 is of utmost simplicity both in the materials utilized in its make-up, and the steps of fabricating it. The sheet of asbestos is very inexpensive, and the sheets of reflective material are also relatively inexpensive, and thus the pads can be assembled with the utmost simplicity. Consequently, a person may easily provide himself with a relatively large number of such pads, of various sizes so as to accommodate all of various size cooking vessels. The pads are easily cleaned if they become soiled and while they need not be of throwaway character, they are so inexpensive that if any should be lost or otherwise debilitated after only a few times of use, the loss will not be great.

Cooking in grills of this type is highly desired by many people and the flavor and taste of the food so obtained is very favorable to those people. The liquid drippings or grease, indicated at 50, when the food is cooked according to the present method is desirable for further use, e.g., for use in making gravy, etc. This advantage did not exist in the case where the food was cooked by previous methods where the drippings ordinarily burned and the residue became solid. The aroma from these drippings adds to the flavor of the food being cooked, thus producing a further advantage.

As is well-known, additional flavor is often desired in the barbeque-type of cooking, such as by providing hickory chips, in the fuel. Employing the present invention, convection currents cause the smoke from all of the fuel, including the hickory chips, to intimately contact the food and this adds to the taste of the food. The preservation of the food in unburnt condition, by the use of the pad in accordance with the present invention, also imparts greater benefit to the food from the hickory chips or other fuel additives.

The use of a grill of this type, i.e., having a cover 20, confines the vapors so that they add taste and aroma to the food.

Another great advantage is that when the device of this invention is used, the user, after placing the food in position for cooking, may simply ignore the matter until the cooking period has concluded. For example, there is no need for basting or providing a rotisserie or in other ways moving the food to prevent burning since the heat from the fuel is distributed evenly over the food, and the intense and concentrated heat previously provided by the radiant heat is eliminated.

While a preferred embodiment of the method and apparatus of the present invention has been illustrated and described, it will understood that changes and modifications may be made therein without departing from the invention in its broader aspects.

Various of the features of the invention are defined in the following claims.

What is claimed is:

1. A method of cooking food in an enclosed cooking chamber that includes means defining a heat source in the lower portion of the chamber and a horizontal grate located within the chamber above the heat source means, comprising the steps of:

placing food to be cooked in an open cooking vessel;

locating the cooking vessel with the food on the grate above the heat source means;

reflecting radiant heat and deflecting heated air currents away from direct application to the cooking vessel from the heat source means by locating a removable pad intermediate the grate and the cooking vessel, said pad comprising a relatively rigid and self-sustaining heat insulating core material and top and bottom layers of radiant heat reflective metallic foil, and said pad having horizontal dimensions providing an area at least as large but not materially larger than the exposed area of the cooking vessel and less than the horizontal dimensions of the grate, said metallic foil layers including a shiny reflective side and a less reflective side, the shiny reflective side of each foil layer being directed downwardly toward the heat source means;

providing space surrounding the cooking vessel within the cooking chamber; and causing convected heat currents to flow vigorously through the cooking chamber to contact all exposed surfaces of the food being cooked in the vessel by closing the cooking chamber;

whereby heat concentration on the cooking vessel is eliminated and heat is distributed evenly over the food in the cooking vessel.

2. In a convection cooking apparatus comprising an enclosed cooking chamber, means defining a heat source located within the cooking chamber, a horizontal grate located within said chamber and above the heat source means, and an open food containing cooking vessel, in the chamber an improved pad for positioning upon the grate above the heat source means and under the cooking vessel, said pad comprising a relatively rigid and self-sustaining heat insulating core material and top and bottom layers of radiant heat reflective metallic foil, and said pad having horizontal dimensions providing an area at least as large but not materially larger than the exposed area of the cooking vessel and less than the horizontal dimensions of the grate, said metallic foil layers including a shiny reflective side and a less reflective side, the shiny reflective side of each foil layer being directed downwardly toward the heat source means, whereby radiant heat from the heat source means is reflected by said pad toward said heat source means and away from the cooking vessel so that convection heat currents are deflected by said pad and flow vigorously through the cooking chamber to contact all exposed surfaces of food contained in the cooking vessel.

3. An apparatus as defined in claim 2 wherein said core comprises an asbestos sheet having a thickness of about 3/32 inches and said metallic foil is an aluminum foil having a shiny side and a brush metal side which is less reflective.

* * * * *